(12) United States Patent
Koetje

(10) Patent No.: US 12,440,674 B2
(45) Date of Patent: Oct. 14, 2025

(54) APPARATUS FOR DETECTING MOTION

(71) Applicant: Actegy Limited, Bracknell (GB)

(72) Inventor: Anno Jakob Koetje, Surrey (GB)

(73) Assignee: Actegy Limited, Bracknell (GB)

( * ) Notice: Subject to any disclaimer, the term of this patent is extended or adjusted under 35 U.S.C. 154(b) by 403 days.

(21) Appl. No.: 18/002,857

(22) PCT Filed: Jun. 22, 2021

(86) PCT No.: PCT/GB2021/051581
§ 371 (c)(1),
(2) Date: Dec. 21, 2022

(87) PCT Pub. No.: WO2021/260366
PCT Pub. Date: Dec. 30, 2021

(65) Prior Publication Data
US 2023/0256246 A1    Aug. 17, 2023

(30) Foreign Application Priority Data

Jun. 22, 2020 (GB) .................................. 2009479

(51) Int. Cl.
*A61N 1/36* (2006.01)
(52) U.S. Cl.
CPC ..... *A61N 1/36031* (2017.08); *A61N 1/36003* (2013.01); *A61N 1/36034* (2017.08)
(58) Field of Classification Search
CPC ............ A61N 1/36031; A61N 1/36034; A61N 1/36003

(Continued)

(56) References Cited

U.S. PATENT DOCUMENTS

2006/0085047 A1    4/2006    Unsworth et al.
2012/0016431 A1    1/2012    Paul et al.
(Continued)

FOREIGN PATENT DOCUMENTS

CN    107614054 A    1/2018
DE    19605411 C1    7/1997
(Continued)

OTHER PUBLICATIONS

International Search Report, PCT/GB2021/051581, Dated Oct. 4, 2021.

*Primary Examiner* — Nadia A Mahmood

(57) ABSTRACT

Apparatus (30) for detecting motion of a device (1) for electrical stimulation of a subject is described. The apparatus (30) comprises a motion detector (2) to detect the motion of the device (1) and generate a motion output signal in response to the detected motion. The motion output signal is indicative of the amount of detected motion. A processor (21) is coupled to the motion detector (20). The processor (21) receives (72) the motion output signal from the motion detector (20) and generates a first processor output signal in response to the received motion output signal. An output device (14, 26) is coupled to the processor (21). The output device (14, 26) receives the first processor output signal from the processor (21) and generates a first output signal in response to the received first processor output signal. The processor (21) generates the first processor output signal if either: (i) the received motion output signal is greater than a threshold; or (ii) the received motion output signal is less than a threshold.

19 Claims, 8 Drawing Sheets

(58) Field of Classification Search
USPC .......................................................... 607/48
See application file for complete search history.

(56) References Cited

U.S. PATENT DOCUMENTS

| | | | |
|---|---|---|---|
| 2015/0045693 A1* | 2/2015 | Otsamo | A61B 5/1104 600/554 |
| 2016/0029891 A1 | 2/2016 | Lin | |
| 2017/0106189 A1 | 4/2017 | Keller et al. | |

FOREIGN PATENT DOCUMENTS

| | | |
|---|---|---|
| GB | 2493904 B | 3/2014 |
| WO | 9964105 A1 | 12/1999 |

* cited by examiner

APPARATUS FOR DETECTING MOTION

The invention relates to apparatus for detecting motion and especially of a device for electrical stimulation of a subject.

The electrical stimulation of a subject for improving circulation is known. In particular, the electrical stimulation of the feet and legs of a subject to improve venous blood flow is known and reported in the art. For example, Kaplan, R. E. et al., 'Electrical foot stimulation and implications for the prevention of venous thromboembolic disease', (Thrombosis and haemostasis, 2002, vol. 88, no2, pages 200 to 204) describe the results of experiments conducted on subjects, in which mild electrical stimulation was applied to the calf or plantar muscles of the subject. Analysis showed an increase in the venous femoral and popliteal blood flow of the side of the subject to which electrical stimulation was applied, compared with the non-stimulated side.

Further, W Man, I. O., et al. 'Effect of neuromuscular electrical stimulation on foot/ankle volume during standing' (Med Sci Sports Exerc., 2003, April, 35(4), pages 630 to 634) report that the neuromuscular electrical stimulation of the lower leg muscles of a subject prevented the increase in volume of the feet and ankles generally experienced after extended periods of standing. It was concluded that neuromuscular electrical stimulation provided a means for reducing swelling in the lower limbs of subjects that are not capable of fully activating their musculo-venous pumps.

Faghri, P. D., et al., 'Electrical stimulation-induced contraction to reduce blood stasis during arthroplasty' (IEEE Trans Rehabil Eng., 1997, March, 5(1), pages 62 to 69) report data suggesting that continuous electrical stimulation-induced contractions could improve lower leg circulation in subjects by eliciting the physiologic muscle pump. This will lead, in turn, to improved venous circulation and a reduction of blood stasis, for example during total hip and/or knee surgery. The authors suggest this technique may offer greater protection against deep vein thrombosis (DVT) and pulmonary embolism (PE) during surgery than the commonly used sequential compression devices and techniques.

Faghri, P. D., et al., 'Venous hemodynamics of the lower extremities in response to electrical stimulation' (Arch Phys Med Rehabil., 1998, July, 79(7), pages 842 to 848) concluded from experiments conducted that periodic single electrostimulation-induced calf muscle contractions produced significant muscle pump function and could be used to improve venous blood flow and reduce stasis in the lower leg, while continuous electrostimulation-induced contractions could improve lower leg peripheral perfusion while eliciting the physiologic venous muscle pump.

Anderson, S. I., et al., 'Chronic transcutaneous electrical stimulation of calf muscles improves functional capacity without inducing systemic inflammation in claudicants' (Eur J Vasc Endovasc Surg., 2004, February, 27(2), pages 201 to 209) report that chronic electrical muscle stimulation is an effective treatment for alleviating intermittent claudication. The technique, by targeted activation of a small muscle mass, does not engender a significant systemic inflammatory response.

A method of neuro-muscular stimulation for the prevention of venous thrombosis and pulmonary embolism is disclosed in U.S. Pat. No. 5,358,513. The method comprises applying electrical stimulation to the subject by means of electrodes attached to an anterior portion of the subject's knee immediately proximal the common peroneal nerve. The electrical stimulation is applied as trains of pulse modulated sinusoids.

More recently, U.S. Pat. No. 6,615,080 discloses the neuroelectrical stimulation of the foot muscles of a subject for the prevention of deep vein thrombosis (DVT), pulmonary embolism (PE) and lower extremity edema. The method comprises applying electrical pulses to the muscles of the foot, in particular in a square wave pattern of variable frequency, duration, intensity, ramp time and on-off cycle. The electrical stimulation is applied to the soles of the feet of the subject, to reduce the pooling of blood in the soleal veins.

Devices for the electrical stimulation of a subject are known and are commercially available. In particular, devices for applying electrical stimulation to the feet of subjects, especially to the plantar muscles, are known and commercially available. One example of such a device is the REVITIVE® Circulation Booster™ available from Actegy Limited in the United Kingdom and described in UK Patent Application No. 2493904.

The device disclosed in GB2493904A comprises a circular disc with a pair of electrical contact pads on one side of the disc and a rocker element on the opposite side. In use, the user places their feet on the pads and the rocker element contacts the floor or ground so that the device can rock backwards and forwards on the rocker element. Electrical stimulation of a variable intensity is then provided through the pads to the plantar muscles of the feet of the user to cause repeated contraction and relaxation of the leg muscles of the user. The advantage of the rocker element is that it allows the disc to rock (or pivot) forwards and backwards thereby permitting a user's feet to move about the ankle joint during the electrical stimulation cycle.

As different users respond differently to the electrical stimulation, during use of the device, the user can adjust the magnitude of the electrical stimulation to a level appropriate to him or herself.

The inventors have discovered that because the magnitude of the electrical stimulation is adjustable, some users operate the electrical stimulation device with insufficient magnitude to obtain the full benefits of the electrical stimulation. Therefore, it would be advantageous if it was possible to indicate to a user when the magnitude of the electrical stimulation is at a sufficient magnitude to obtain maximum or near maximum benefit from the electrical stimulation.

In accordance with a first aspect of the present invention, there is provided apparatus for detecting motion of a device for electrical stimulation of a subject, the apparatus comprising:

(i) a motion detector to detect the motion of the device and generating a motion output signal in response to the detected motion, the motion output signal being indicative of the amount of detected motion;

(ii) a processor coupled to the motion detector, the processor receiving the motion output signal from the motion detector and generating a first processor output signal in response to the received motion output signal;

(iii) an output device coupled to the processor, the output device receiving the first processor output signal from the processor and generating a first output signal in response to the received first processor output signal; and wherein the processor generates the first processor output signal if either: (i) the received motion output signal is greater than a threshold; or (ii) the received motion output signal is less than a threshold.

Preferably, the processor also generates a second processor output signal and wherein: (i) if the first processor output signal is generated when the received motion output signal is greater than the threshold, the processor generates the second processor output signal if the received motion output signal is less than the threshold; or (ii) if the first processor output signal is generated when the received motion output signal is less than the threshold, the processor generates the second processor output signal if the received motion output signal is greater than the threshold; and wherein the output device receives the second processor output signal and generates a second output signal in response to the received second processor output signal.

Typically, the motion detector comprises an accelerometer.

The output device may comprise at least one of: a visual display device; an audible signal output device; a haptic signal output device; and a wireless data signal output device. The wireless data signal output device may operate on one or more wireless network protocols, such as Bluetooth® or Wi-Fi based on the IEEE 802.11 family of standards. For example, the wireless data signal output device may comprise a Bluetooth® transmitter.

Preferably, the motion output signal is proportional to the detected motion.

Typically, the motion detected is a rotational motion.

Typically, where the motion detector comprises an accelerometer, the motion output signal is directly proportional to the sine of a change in angle of the device as a result of the motion of the device.

Preferably, the motion detected is a repetitive motion of the device.

In accordance with a second aspect of the present invention, there is provided a device for electrical stimulation of a subject, the device comprising apparatus in accordance with the first aspect and optionally any features of the first aspect; and electrical stimulation means that is adapted to apply an electrical stimulation voltage to muscles of the subject, in use, to generate the motion of the device.

Preferably, the processor has an output that is coupled to the electrical stimulation means to enable the processor to control the electrical stimulation voltage.

Typically, the processor increases the electrical stimulation voltage if the received motion output signal is less than the threshold.

Preferably, the processor is adapted to be coupled to a user input device and the processor is configured to control the electrical stimulation voltage in response to a user input signal received from the user input device, in use.

In one example of the invention, the processor may increase the electrical stimulation voltage without receiving a user input signal, if the received motion output signal is less than the threshold.

Preferably, where the processor increases the electrical stimulation voltage without a received user input signal, the processor additionally sends a third processor output signal to the output device, the output device generating a third output signal in response the third processor output signal, the third output signal being indicative of the processor increasing the electrical stimulation voltage. The increase in the electrical stimulation voltage may be stopped by the processor in response to a received user input signal.

Typically, the electrical stimulation means are adapted to stimulate the muscles of a limb of a subject. Preferably, the electrical stimulation means are adapted to stimulate the muscles of a lower limb of a subject, such as at least one of the leg and foot muscles of a user.

Typically, the electrical stimulation means comprises a first electrical contact surface and a second electrical contact surface. Preferably, the first and second electrical contact surfaces are adapted to contact a first and a second limb, respectively of a subject, in use. In one example of the invention, the first and second electrical contact surfaces are adapted to contact a first foot and a second foot, respectively of a subject, in use.

Typically, the electrical stimulation means further comprises an electrical voltage supply device electrically coupled to the first and second electrical contact surfaces and adapted to apply an electric voltage across the first and second electrical contact surfaces.

Preferably, the electrical voltage supply device outputs an alternating electrical voltage waveform across the first and second electrical contact surfaces. More preferably, the electric voltage applied across the first and second electrical contact surfaces by the electrical supply device comprises a plurality of voltage pulses.

Preferably, the processor only generates the first processor output signal when the electrical stimulation means applies the electrical stimulation voltage.

Typically, the processor only generates the second processor output signal when the electrical stimulation means applies the electrical stimulation voltage.

Preferably, the device further comprises a pivot member, the pivot member being adapted to permit the device to pivot around the pivot member in response to motion of the body part.

In accordance with a third aspect of the invention, there is provided a system comprising either: (i) apparatus in accordance with the first aspect; or (ii) a device in accordance with the second aspect; and a remote device comprising a remote wireless data input device and a remote output device; wherein the output device comprises a wireless data output device and the first output signal comprises a wireless data signal emitted by the wireless data output device; and the remote wireless data input device is adapted to receive the wireless data signal and the remote output device generates a remote user output signal in response to the received wireless data signal.

The remote wireless data signal input device may operate on one or more wireless network protocols, such as Bluetooth® or Wi-Fi based on the IEEE 802.11 family of standards. For example, where the wireless data output device comprises a Bluetooth® transmitter, the remote wireless data input device may comprise a Bluetooth® receiver.

The remote user output signal generated by the remote device may be at least one of: a visual output signal; an audible output signal; and a haptic output signal.

Typically, the remote device comprises a remote device processor coupled to the wireless data input device and the remote output device, the processor generates a remote device processor output signal in response to the received wireless data signal, and the remote output device receives the remote device processor output signal and generates the remote user output signal in response to the remote device processor output signal.

Typically, the remote device is a mobile device and the remote user output signal generated by the mobile device is generated and displayed on a user interface of the mobile device by application software on the mobile device.

The term "mobile device" as used herein means any portable electronic device having a wireless receiver and a user interface including a display, and includes (but is not limited to) smartphones, tablets and laptop computers.

Preferably, the remote device comprises a remote user input device which is adapted to receive an input from a user and a remote wireless data output device; in response to a received input from a user on the remote user input device, the remote device being adapted to transmit a remote user input signal to the apparatus, the apparatus comprising a wireless data input device adapted to receive a remote user input signal transmitted by the remote wireless data output device, the processor being adapted to receive the remote user input signal from the wireless data input device.

Where the remote device comprises a user interface, the user interface may be adapted to display the remote user output signal and to receive the user input.

Typically, the processor controls the electrical stimulation voltage in response to the received remote user input signal, in use.

Preferably, the wireless data output devices and wireless data input devices are each integrated into a single device, such as a wireless transceiver. For example, the transceivers may comprise Bluetooth® transceivers.

Where the system comprises a device in accordance with the second aspect, the first processor output signal may be sent by the processor to the output device and another output device on the device, the other output device comprising at least one of a visual display device; an audible signal output device; and a haptic signal output device.

An advantage of the invention, is that the inventors have realised that it is possible to indicate to a user whether the level of electrical stimulation is sufficient by monitoring the degree of movement of the device generated by movement of a user's feet in response to the electrical stimulation.

An example of apparatus for and a method of detecting motion of a device for electrical stimulation of a subject will now be described with reference to the accompanying drawings, in which.

Figure 1:
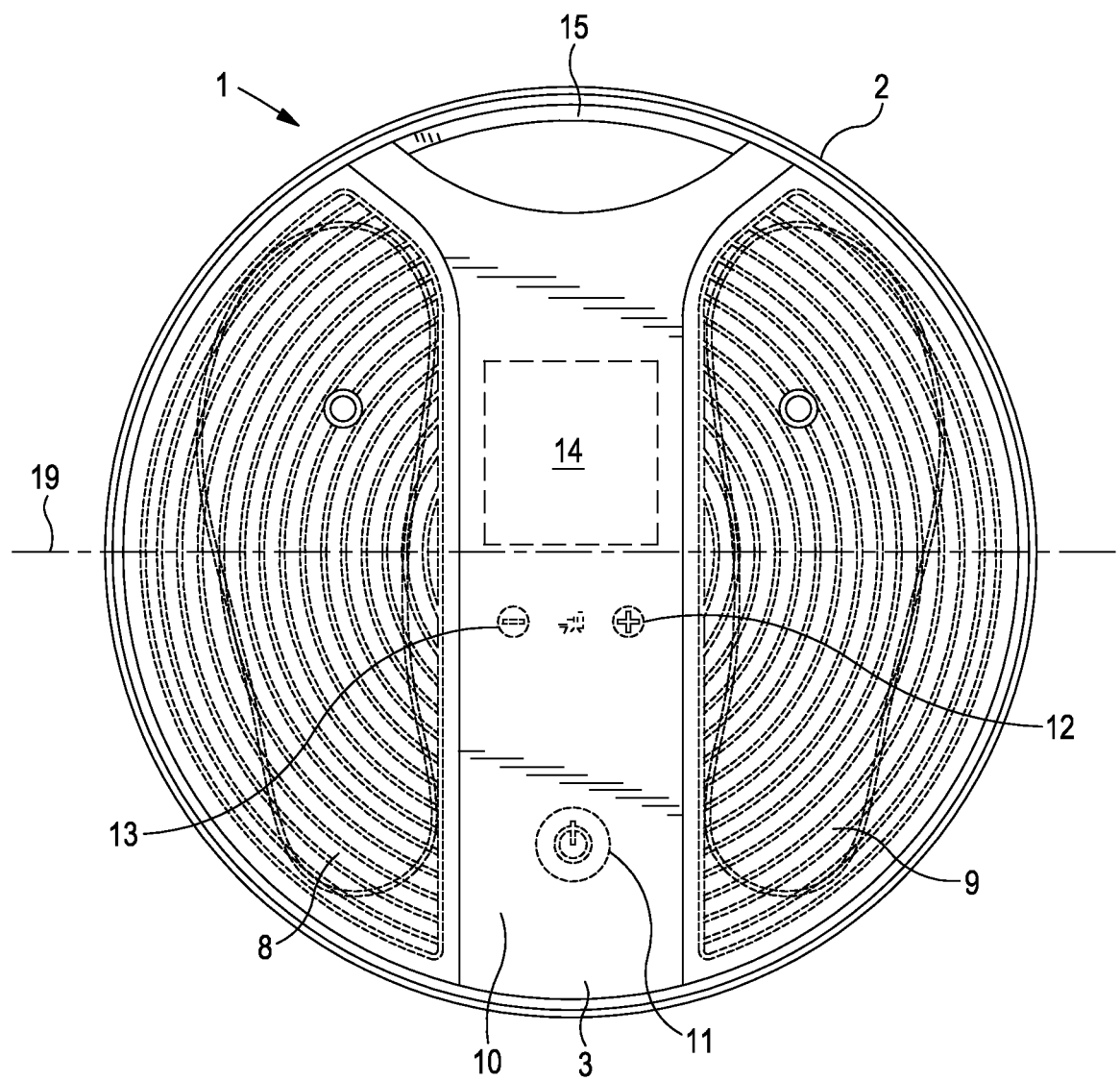
FIG. 1 is a plan view of a device for electrical stimulation of a subject incorporating apparatus for detecting motion of the device.
Figure 2:
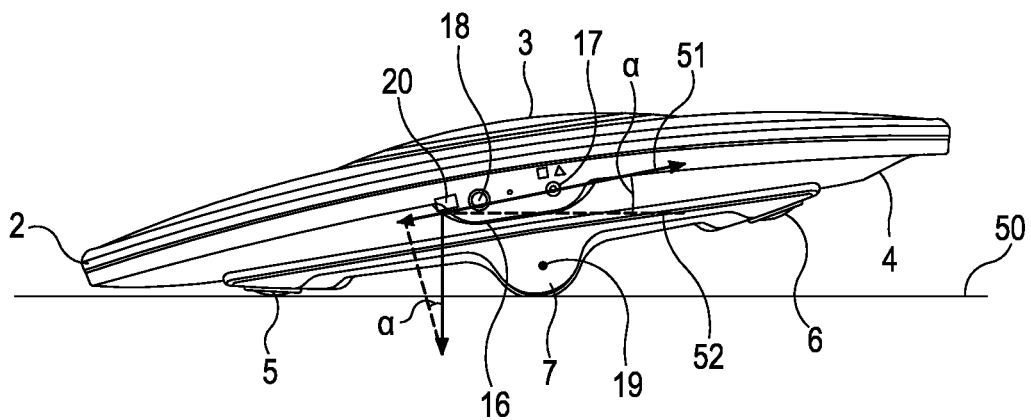
FIG. 2 is a side view of the device in a rest position.
Figure 3:
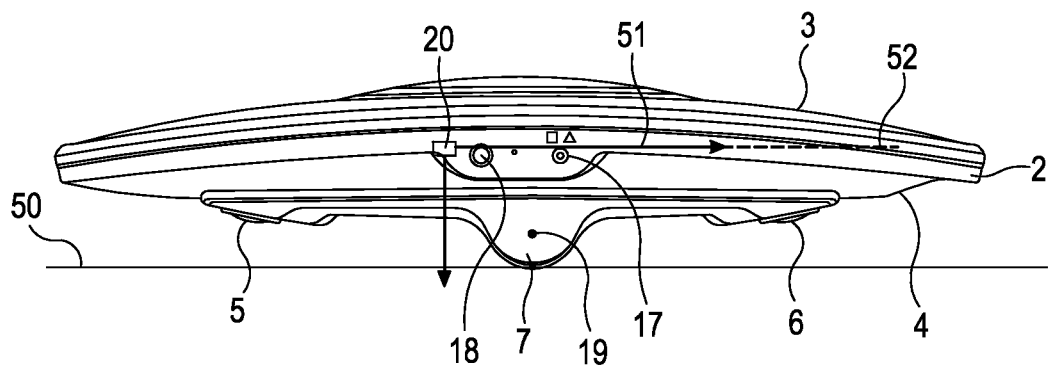
FIG. 3 is a side view of the device in a horizontal position.
Figure 4:
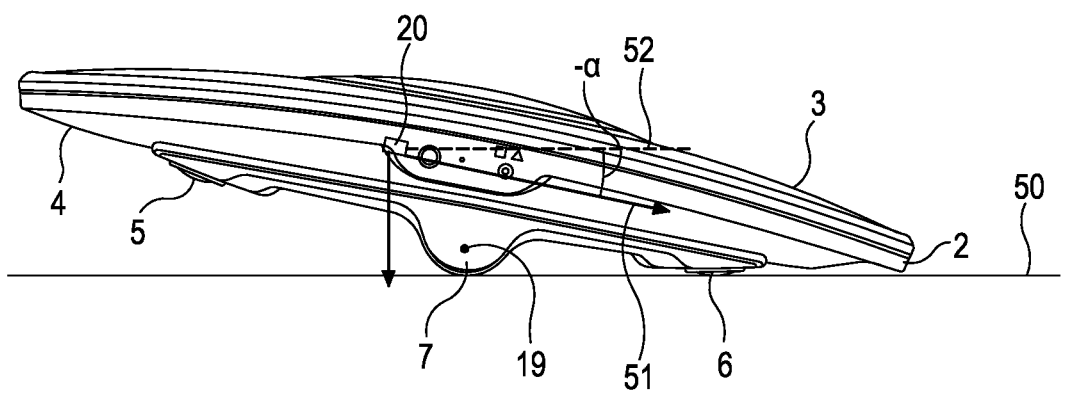
FIG. 4 is a side view of the device in a maximum displacement position.

FIG. 1 is a plan view of a device 1 for electrical stimulation of the plantar surfaces of the feet of a subject or user. The device 1 comprises a housing 2 that is generally in the form of a circular disc. The housing 2 incorporates a handle 15 to permit the device 1 to be easily moved by a user. FIG. 2 is a side view of the device 1 in a rest position and it can be seen that the housing 1 has a generally convex curved upper surface 3 and a generally convex lower surface 4. Located on a side section 16 of the housing is a power adapter socket (or power jack) 18 to which a power adapter can be plugged in to provide power to the device 1 and/or to charge a rechargeable power supply unit 25 (see FIG. 5) located within the housing 2. The rechargeable power supply is typically a rechargeable battery. Also located on the side section 16 is a socket 17 for connection of external contact pads which positioned on other parts of the body such as on the leg muscles. Located centrally within the device 1 is an accelerometer 20. The accelerometer 20 is mounted wholly within the device 1 and is not normally visible externally but its general location is indicated in FIGS. 2 to 4 to assist with understanding of the invention and the operation of the apparatus incorporated within the device 1.

The lower surface 4 includes a rest position stop 5 and a maximum position stop 6. Located between the stops 5, 6 are two rocker elements 7 (only one shown).

The upper surface 3 includes two electrical contact pads 8, 9 separated by a central display and control panel 10. The electrical contact pads 8, 9 have ribbing formed on them, as indicated in phantom on the pads 8, 9 and both the pads 8, 9 are formed from an electrically conducting material, such as a metal. For example, the pads 8, 9 may be formed from aluminium.

The display and control panel 10 includes a power button 11, up and down controls 12, 13 and a display 14. The power button 11, the up and down controls 12, 13 and the display 14 are shown in phantom as they are normally only visible when illuminated. The power button 11 and the up and down controls 12, 13 are touch sensitive areas of the zone 10 and so are shown in phantom.

As shown in FIGS. 2 to 4, when the device 1 is positioned on a support surface 50, such as a floor or the ground, it is pivotable about pivot axis 19 from the rest position shown in FIG. 2 in which the rest stop 5 and rocker elements 7 contact the support surface, through an intermediate pivot position shown in FIG. 3, in which only the rocker elements 7 contact the support surface, to a maximum pivot position shown in FIG. 4 in which the rocker elements 7 and the maximum position stop 6 contact the support surface.

Figure 5:
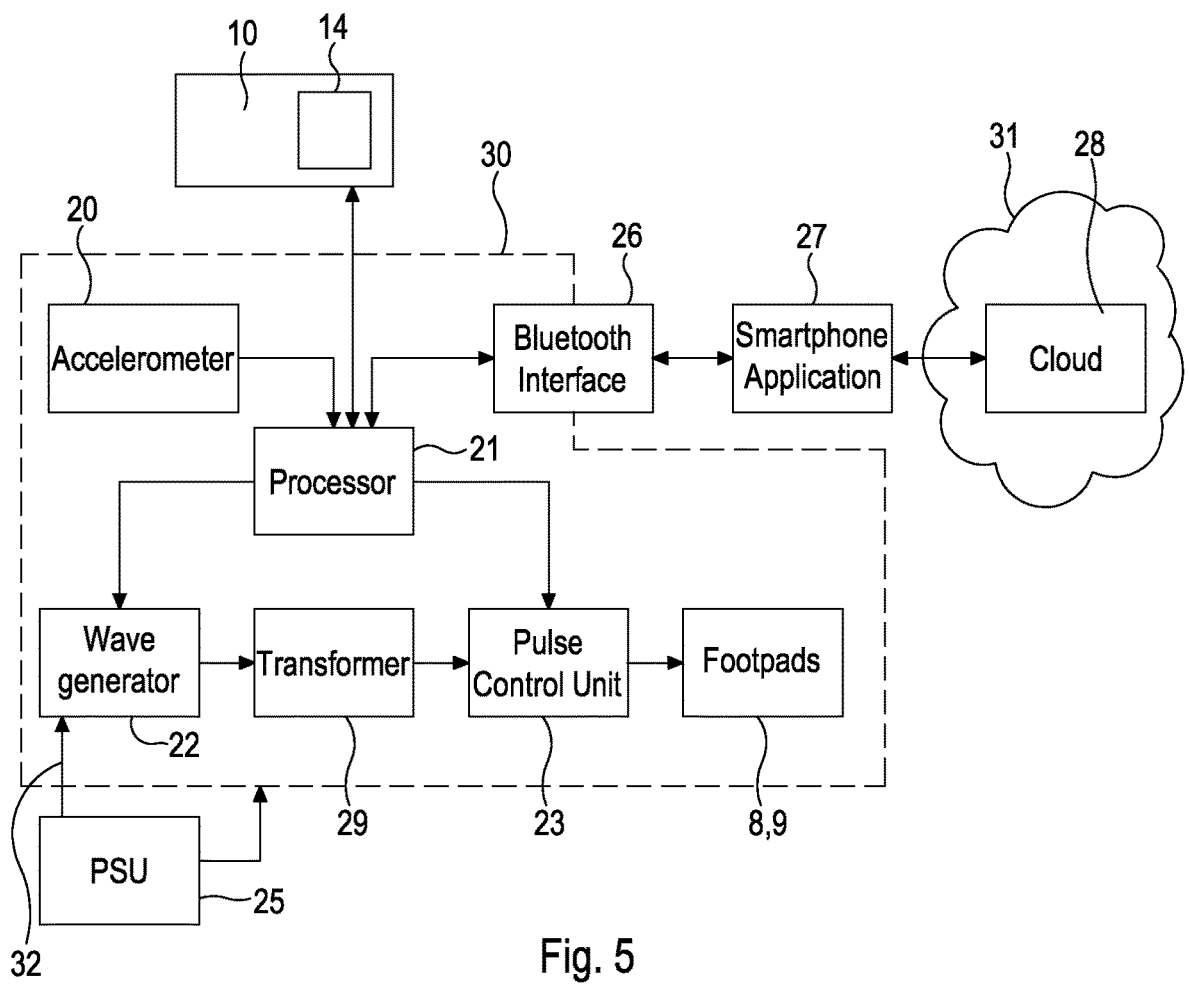
FIG. 5 is a block diagram illustrating the components of the apparatus for detecting motion.

Located within the device 1 is apparatus 30 for controlling and feeding the electrical stimulation cycle voltage to the foot pads 8, 9 and for detecting the motion of the device 1. FIG. 5 is a block diagram of the apparatus 30. FIG. 5 also shows the power supply unit (PSU) 25 that is located within the housing 2 and provides electrical power to all the electrical components within the device 1 and a Bluetooth interface 26 between the apparatus 30 and smartphone 27 and a data storage server 28 located in the cloud on the Internet. The Bluetooth interface 26 comprises a Bluetooth transceiver located within the device 1 and a Bluetooth transceiver located on the smartphone 27. The Bluetooth interface 26 is used to enable the apparatus 30 to communicate with the smartphone 27 of a user. This can be used to enable the processor 21 to send information to the smartphone 27 to be displayed on the smartphone using a software application running on the smartphone and/or to enable control signals to be sent from the smartphone to the processor to control the operation of the apparatus 30. Typically, the smartphone 27 will receive input from a user via a software application running on the smartphone and in response to the input received send a control signal to the processor via the Bluetooth interface 26.

The data storage server 28 can be used to download updates to the device 1 via the smartphone 7. For example, this could be software updates and/or could be configuration or data updates.

The PSU 25 is coupled to the power jack 18 and also to rechargeable batteries located within the device 1. Hence, the PSU 25 may be powered by either an external electrical power supply via the jack 18 or by the internal batteries. However, it is possible that the device 1 may not include internal batteries and could be powered solely by an external power source via the jack 18. For example, the external power source is typically a 5V power adapter that connects to a 110V or 240V electrical mains power supply. The power adapter takes the 110V or 240V AC external main power supply and converts it to a 5V DC output voltage that is then fed to the power jack 18.

The apparatus 30 comprises the accelerometer 20, the output of which is coupled to an input of a processor 21. Typically, the processor 21 is a micro-controller unit (MCU). As well as receiving the output from the accelerometer 20, the processor 21 controls a wave generator 22 and a pulse control unit 23 and also is coupled to the Bluetooth transceiver on the device 1.

The wave generator 22 creates an alternating waveform from a 5V DC input from the PSU 25. This alternating waveform is then stepped up by transformer 29 before being fed to a pulse control unit 23 that generates, under control of the processor 21, the desired voltage pulse shape and duration. The voltage output from the pulse control unit 23 is then delivered across the footpads 8, 9 to provide the required electrical stimulation to the feet.

Figure 9:
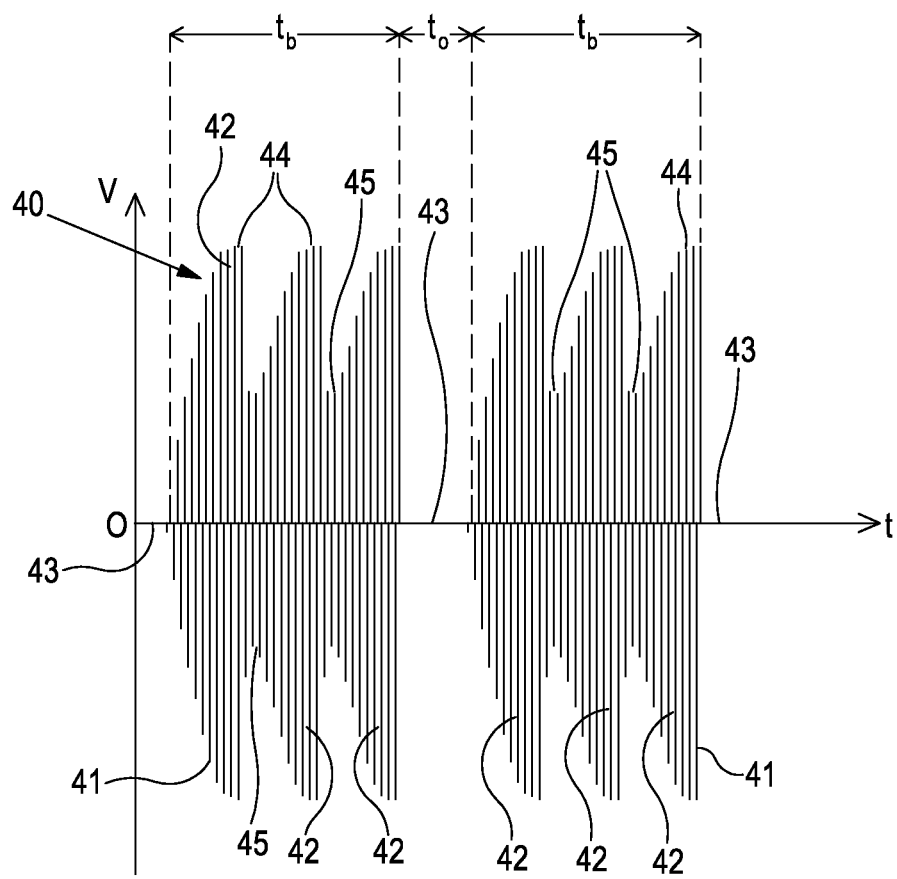
FIG. 9 illustrates an example of an electrical stimulation cycle for use with the device.

An example of an electrical stimulation cycle waveform 40 output by the pulse control circuit 23 is shown in FIG. 9, which is a graph of voltage (V) against time (t).

The electrical stimulation cycle waveform 40 comprises repeated waveform bursts 41 (only two shown in FIG. 9). Each burst 41 has a burst duration ($t_b$) and is separated from adjacent bursts 41 by a zero output voltage 43 having a duration ($t_0$). Typically, the burst duration ($t_b$) is from approximately 1 second to 10 seconds and the zero voltage duration ($t_0$) is from approximately 0.5 seconds to 2 seconds and possibly up to 10 seconds. Each burst 41 comprises multiple pulses that are modulated into three peaks 42 and each peak 42 has a peak voltage 44 and a minimum voltage 45. The typical peak voltage 44 on maximum intensity setting may be a maximum of around 90V with a typical corresponding minimum voltage 45 of around 40V.

The different parameters of the electrical stimulation cycle voltage 40 that are controlled by the processor 21 include the number of pulses 42 in each burst 41, the time interval ($t_0$) between adjacent bursts 41, the duration ($t_b$) of each burst 41, the number of pulses 42 in each burst, the peak voltage 44 and the minimum voltage 45.

In use, by placing one foot on each of the contact pads 8, 9, the user completes an electrical circuit, allowing the pulsed electrical signal to travel from one foot to the other and stimulate muscle contraction in the feet and legs of the user. This muscle contraction causes the feet and legs of the user to move, in particular about the joints in the feet and ankles, which generates a rocking movement of the device 1 which is able to pivot on the rocking elements 7. The amount of pivoting motion created by the user may be from the rest position shown in FIG. 2 up to the maximum pivot position shown in FIG. 4.

Each pulse 42 stimulates a muscle contraction in the feet and legs of the user causing the device to pivot from the rest position shown in FIG. 2. The magnitude of the peaks 44 of the pulses 42 determine the amount of muscle contraction and therefore, how far the device 1 pivots from the rest position. During each burst 41 the muscle contraction would cause the device 1 to pivot away from the rest position of FIG. 2 and the device 1 would not return to the rest position until the end of the burst 41.

The user can control the strength of the electrical stimulation cycle voltage 40 by using the buttons 12, 13 on the control panel 10 or via the buttons 81, 82 (see FIGS. 10 and 11) on the user interface 80 of the software application on the smartphone 27 that is connected to the device 1 by means of the Bluetooth interface 26. The ability of a user to control the strength of the electrical stimulation cycle voltage 40 is necessary as different people respond differently to the electrical stimulation cycle voltage 40. In addition, as a user adjusts to the electrical stimulation cycle voltage 40, it is frequently necessary for the user to increase the strength to obtain the same desired effect. Increasing the strength of the electrical stimulation cycle voltage 40 using the control button 12 effectively increases the peak voltage 44.

A higher peak voltage 44 will generally produce a greater pivoting motion of the device 1 from the rest position for a given user.

The inventor has appreciated that in some instances a user may be using the device 1 but the strength of the electrical stimulation cycle that they have selected, although it may be sufficient to generate some muscle contraction, it may not be sufficient to generate a beneficial result from using the device 1.

The inventor has also appreciated that the amount of muscle contraction experienced by a user can be correlated to the degree of rocking motion of the device 1. Therefore, the inventor has realised that the degree of rocking movement of the device 1 from the rest position can be used to determine whether the strength (ie the peak voltage 44) of the electrical stimulation cycle voltage 40 is sufficient to provide the user with a beneficial result from use of the device 1.

The accelerometer 20 is aligned to detect rocking motion of the device 1 so that x-axis 51 of the accelerometer 20 extends substantially perpendicularly to the pivot axis 19 of the device 1 in a direction between the rest stop 5 and the maximum stop 6. As shown in FIG. 2, when the device is in the rest position, the accelerometer x-axis 51 points upwards at an angle +α to horizontal plane 52. In this position the earth's gravitational vector projected along the x-axis 51 of the accelerometer 20 is gx. This is proportional to the sine of the angle α. That is:

$$gx = g \sin \alpha$$

where α is the angle of the x-axis 51 to the horizontal plane 52 and g is the magnitude of the gravitational vector, which is approximately equal to 9.81 ms$^{-2}$.

As the device 1 pivots on the rocker element 7 about the pivot axis 19 to the horizontal position shown in FIG. 3, the angle α decreases until the device 1 is in the position shown in FIG. 3 at which the x-axis 51 is coincident with the horizontal plane 52. In this position the angle α is equal to zero and gx=0.

As the device 1 pivots further on the rocker element 7 about the pivot axis 19 towards the position shown in FIG. 4, in which the maximum stop 6 contacts surface 50, the x-axis 51 moves below the horizontal plane 52 and starts to point downwards and the angle between the x-axis 51 and the horizontal plane becomes negative. When the device 1 reaches the position shown in FIG. 4 in which the maximum stop 6 contacts the surface 50, x-axis 51 is at an angle −α to the horizontal plane 52 and gx=g sin (−α), where g is the gravitational force and is approximately 9.81 ms$^{-2}$.

Hence, gx is directly related to the pivot angle of the device 1 and indicates how far the device 1 is pivoted from the rest position of FIG. 2 towards the maximum position of FIG. 4.

For the device 1 shown in FIGS. 1 to 4, angle α when the device 1 is in the rest position is +10 degrees above the horizontal plane 52 and when the device 1 is in the maximum position (see FIG. 4) the angle α is −10 degrees below the horizontal plane 52. Hence, the device 1 has a maximum total angle change of 20 degrees between the rest and maximum positions. However, it is possible that other total angle changes could be used, such as 15 degrees.

Therefore, for the device 1 the angle α=+10 degrees in the rest position corresponds to gx=0.17 g and α=−10 degrees in the maximum position corresponds to gx=−017 g.

The accelerometer 20 detects this pivoting motion of the device 1 and generates an output signal that is indicative of the value of gx. The processor 21 receives the output signal from the accelerometer 20 and monitors the change in gx. From the gx values that the processor 21 receives, the processor 21 can determine how far from the rest position the device 1 pivots during each pulse 42 and compares this with a threshold value to determine whether the device 1 is pivoting sufficiently far from the rest position to produce a beneficial muscle stimulation in a user. This process is explained in more detail below.

Figure 7:
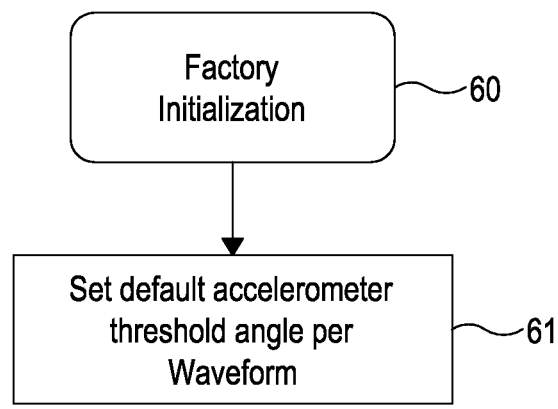
FIG. 7 is a flow diagram illustrating factory initialisation of the apparatus.

During manufacture of the device 1, it undergoes factory initialisation 60 (see FIG. 7). The factory initialisation includes programming of the processor 21 and the storing 61 of preset default parameters in memory in the processor 21. The data stored includes default parameters to enable the apparatus 30 to generate one or more electrical stimulation cycle waveforms, such as the waveform 40 shown in FIG. 9 and a default threshold value for each waveform.

Figure 8:
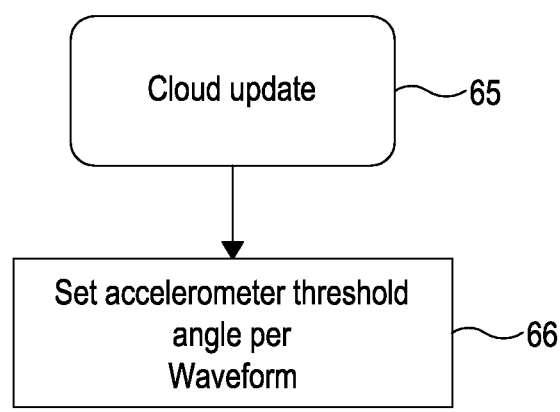
FIG. 8 is a flow diagram illustrating updating of parameters used by the apparatus.

After factory initialisation, the default parameters, including the default threshold for each waveform, can be updated via a cloud update 65 (see FIG. 8). The cloud update 65 downloads data to the memory of the processor 21 from the data server 28 over the Internet 31 and via the application software on the smartphone 27 and the Bluetooth interface 26. This enables the default threshold value for a waveform to be updated 66. For example, updates to the default threshold for a waveform may be necessary if testing data shows that a different threshold for a particular waveform is more appropriate or a new threshold may be required for a new waveform that is downloaded from the data server 28.

In use, a user positions the device on a support surface 50, such as a floor in front of a seat that the user is going to sit on. If the device 1 does not have internal batteries, the user also connects the power input 18 to an external power supply. If the device 1 has internal batteries, the user can opt to either use the internal batteries, in which case it is not necessary to connect the power input 18 to an external power supply or can opt to use the external power supply.

The user then switches the device 1 on using switch 11. This causes the control panel 10 to illuminate. The user then also opens the application software on their smartphone 27 and the application software on the smartphone 27 connects with the device 1 through the Bluetooth interface 26.

Figure 6:
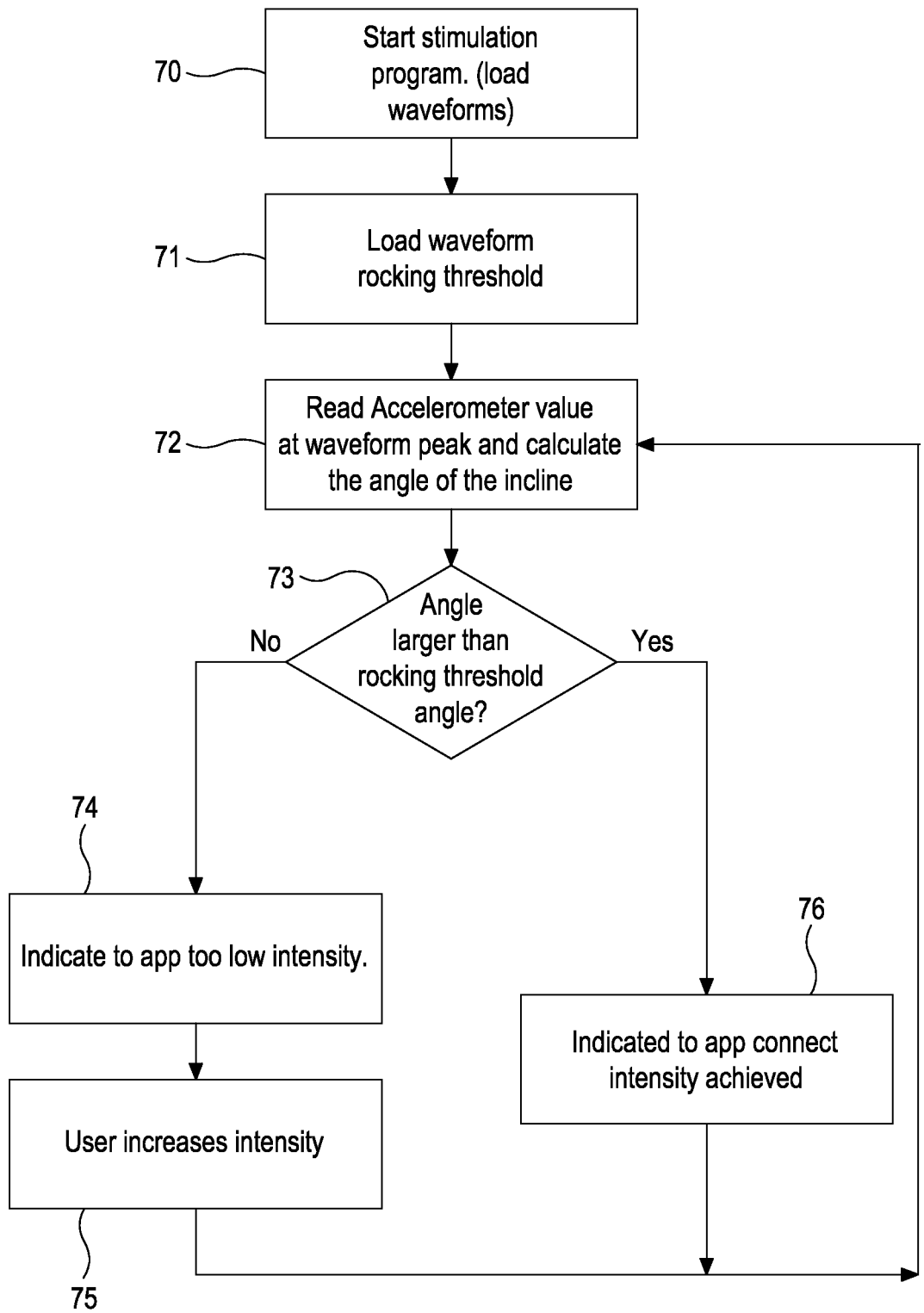
FIG. 6 is a flow diagram illustrating the operation of the apparatus.

When the device 1 has started and the software application is connected, the user can then select a desired waveform using the control panel 10 to software application and the user places one foot on each of the contact pads 8, 9. When a waveform, such as the waveform 40, is selected by a user, the selected waveform is loaded 70 as the active waveform into the processor 21 and the corresponding threshold is also loaded 71. This is shown in the flow diagram of FIG. 6. For the device 1 and the waveform 40, the threshold is set at 2 degrees pivoting motion from the rest position, which corresponds to α=+8 degrees and gx=+0.14 g The electrical stimulation is then started by the processor 21 which applies the waveform voltage across the pads 8, 9. Using the buttons 12, 13 on the control panel 10, the user can then increase or decrease the strength of the electrical stimulation. Alternatively, the user can use an interface 80 on the application software on the smartphone 27 to control the strength of the electrical stimulation by means of virtual buttons 81, 82 on the interface 80. The strength of the electrical stimulation being used can be indicated by numbers 87 and also by a graphical depiction 88 that is in the form of a curve extending from the decrease virtual button 82 to the increase virtual button 81. The threshold applicable to the particular waveform being used is indicated by point 90 on the graphical depiction 88. The interface 80 also includes an icon 89 that indicates the strength of the Bluetooth interface connection between the smartphone 27 and the device 1. Increasing the strength of the electrical stimulation effectively means that the peak voltage 44 is increased. Increasing the strength of the stimulation increases the strength of the muscle contractions in the feet and legs of the user.

As discussed above, the muscle contractions caused by the electrical stimulation cause the user's feet and lower legs to move which generates a pivoting or rocking movement of the device 1 on the rocker elements 7 about the pivot axis 19. The stronger the electrical stimulation, the greater the pivoting motion of the device 1 will be and the further device 1 will pivot or rock towards the maximum position at which the maximum rest 6 contacts the surface 50.

When the device pivots, the accelerometer 20 detects the motion and outputs a signal to the processor 21 which corresponds to gx, as described above. The processor 21 receives the output signals from the accelerometer 20 and from the received signals, calculates 72 the angle α at which the device 1 is pivoted furthest from the rest position shown in FIG. 2. The processor 21 only reads the output from the accelerometer 20 during the time interval tb, which corresponds with when the processor 21 is controlling the pulse control unit 23 to output the burst 41 to the footpads 8, 9. The time interval tb corresponds to when the user's muscles are contracted during the waveform 40 and when device 1 is being pivoted or rocked due to movement of the user's feet and legs caused by the muscle contractions. During the time interval tb the inventors have found that the device 1 does not return to the rest position. This is because the duration of the minimum voltage 45 in the burst 41 is not sufficient to permit the user's muscles to relax before the voltage increases to the next peak voltage 44.

The angle α at this pivoting position that is furthest from the rest position can be calculated using the equation: α=arcsin (gx/g). That is, the processor calculates the maximum pivot angle of the device 1 from the rest position. The processor 21 then compares 73 the calculated angle with the threshold angle for the waveform being used.

As an alternative to calculating the angle α, the threshold could be expressed as the sine of the angle α and the reading from the accelerometer, which is gx compared directly with the threshold as gx is directly proportional to sin α.

Figure 10:
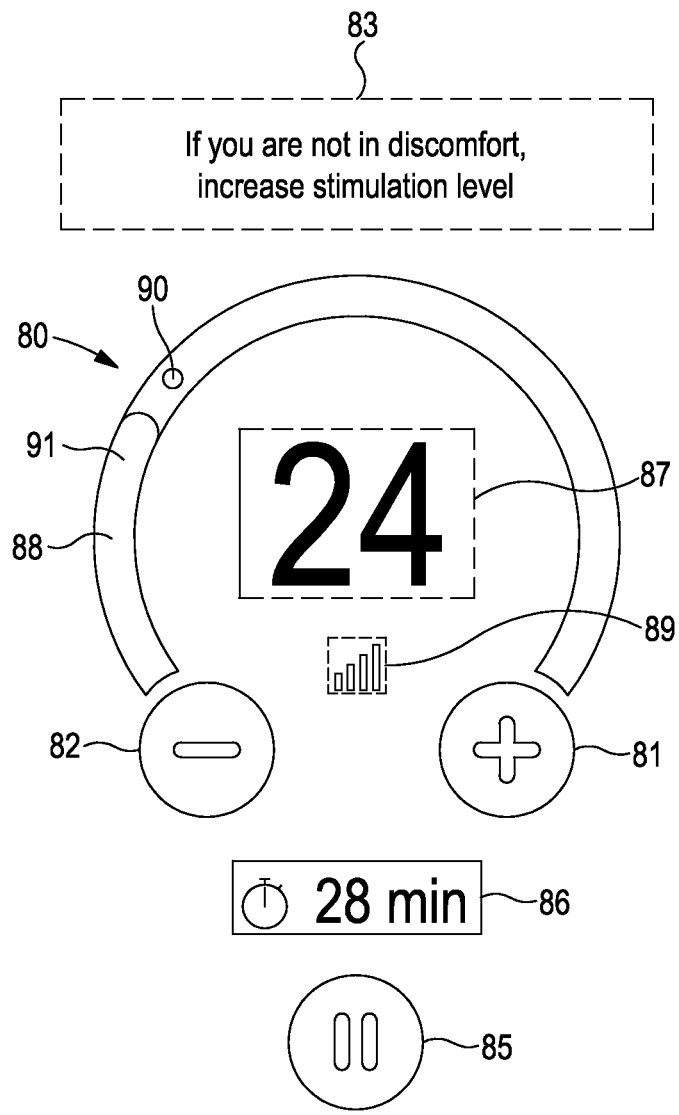
FIG. 10 shows an example of a first output from a display device for use with the apparatus.

If the calculated maximum angle is less than the threshold angle, then the processor outputs 74 a signal via the Bluetooth interface 26 to the application software on the smartphone 27 that the electrical stimulation strength is too low. As shown in FIG. 10, the application software then displays a first message 83 to the user that the user needs to increase the stimulation level. This is also indicated graphically on the graphical depiction 88, where the band 91 has not reached the threshold point 90 and so indicates that the strength of the electrical stimulation is below the threshold. In response to this message 83, the user increases 75 the strength (or intensity) of the stimulation using virtual button 81. Alternatively, the user can increase the intensity directly on the device 1 using the button 12. Increasing the stimulation strength, causes the digital display 87 of the stimulation strength to increase and the band 91 on the graphical depiction 88 to move around the graphical depiction 88 towards the virtual button 81.

In the case of the device 1 with a threshold equivalent to α=+8 degrees or gx=+0.14g, the processor 21 determines that the pivoting motion is insufficient if the calculated maximum pivoting angle α+8 degrees or gx≥0.14 g.

The processor 21 then continues to read the accelerometer value, calculate 72 the maximum angle and compare 73 it with the threshold. If the maximum angle is still below the threshold, the display 80 continues to display the first message 83 and the band 91 is still shown below the threshold point 90.

Figure 11:
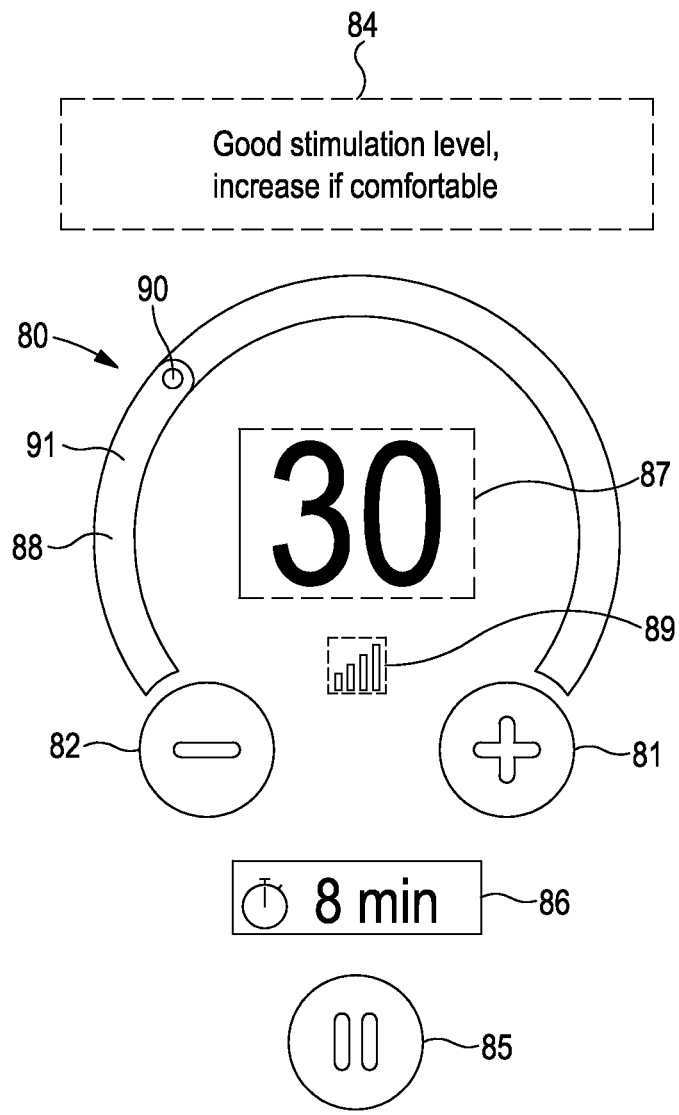
FIG. 11 shows an example of a second output from a display device for use with the apparatus.

When the comparison 73 indicates that the maximum angle is greater than the threshold, the processor outputs 76 a signal via the Bluetooth interface 26 to the application software that the electrical stimulation strength is sufficiently strong. As shown in FIG. 11, in response to this signal from the processor 21, the application software causes a second message 84 to be displayed on the smartphone 27 indicating to the user that the stimulation level is good. In addition, the graphical depiction 88 shows that the stimulation level is above the threshold by displaying the darker band 91 as having reached the threshold point 90. The message may also inform a user that they can increase the stimulation level if it is comfortable.

The processor 21 continues to monitor the output from the accelerometer throughout use of the device and will notify the user via the application software and the first message 83 if the pivoting motion of the device 1 falls below the threshold.

Alternatively, or in addition, to the messages 83, 84 displayed on the smartphone 27 via the application software, it is possible that if the electrical is not strong enough this could be indicated to a user on the display 14 of the device 1. For example, this could by a message similar to the first message 83 or by a light system, such as a red light to indicate that the strength needs to be increased and a green light if the strength is above the threshold. Furthermore, it is also possible that the device 1 or the application software could be configured to output an audible signal to inform a user if the strength is above or below the threshold.

Control panel 10 or the interface 80 can be used to pause the stimulation, such as by use of button 85 on the interface 80. It would be normal when starting the electrical stimulation that this is used for a specific time period, such as 15 minutes and the remaining time 86 for the electrical stimulation may be displayed on the interface and also on the display 14 on the device 1.

An advantage of the apparatus 30 and in particular the accelerometer 20, processor 21 and the application software on the smartphone 27, is that it notifies a user if the electrical stimulation is not strong enough by monitoring the pivoting motion of the device 1.

The invention claimed is:

1. Apparatus for detecting motion of a device for electrical stimulation of a subject, the apparatus comprising:
   (i) a motion detector to detect the motion of the device and generating a motion output signal in response to the detected motion, the motion output signal being indicative of the amount of detected motion;
   (ii) a processor coupled to the motion detector, the processor receiving the motion output signal from the motion detector and generating a first processor output signal in response to the received motion output signal;
   (iii) an output device coupled to the processor, the output device receiving the first processor output signal from the processor and generating a first output signal in response to the received first processor output signal;
   wherein the processor generates the first processor output signal if either: (i) the received motion output signal is greater than a threshold; or (ii) the received motion output signal is less than a threshold; and
   wherein the device further comprises a pivot member, the pivot member being adapted to permit the device to pivot around the pivot member in response to motion of a body part in contact with the device.

2. Apparatus according to claim 1, wherein: (i) if the first processor output signal is generated when the received motion output signal is greater than the threshold, the processor generates a second processor output signal if the received motion output signal is less than the threshold; or (ii) if the first processor output signal is generated when the received motion output signal is less than the threshold, the processor generates a second processor output signal if the received motion output signal is greater than the threshold; and the output device generates a second output signal in response to the second processor output signal.

3. Apparatus according to claim 1, wherein the motion detector comprises an accelerometer.

4. Apparatus according to claim 1, wherein the output device comprises at least one of: a visual display device; an audible signal output device; a haptic signal output device; and a wireless data signal output device.

5. Apparatus according to claim 1, wherein the motion output signal is proportional to the detected motion.

6. Apparatus according to claim 1, wherein the motion detected is a rotational motion.

7. Apparatus according to claim 1, wherein the motion detected is a repetitive motion of the device.

8. An apparatus according to claim 1, wherein the device comprises electrical stimulation means that is adapted to apply an electrical stimulation voltage to muscles of a user, in use, to generate the motion of the body part.

9. An apparatus according to claim 1, wherein the processor has an output that is coupled to the electrical stimulation means to enable the processor to control the electrical stimulation voltage.

10. An apparatus according to claim 9, wherein the processor increases the electrical stimulation voltage if the received motion output signal is less than the threshold.

11. An apparatus according to claim 9, wherein the processor is adapted to be coupled to a user input device and the processor is configured to control the electrical stimulation voltage in response to a user input signal received from the user input device, in use.

12. An apparatus according to claim 1, wherein the electrical stimulation means are adapted to stimulate the muscles of a limb of a user.

13. An apparatus according to claim 12, wherein the electrical stimulation means are adapted to stimulate the muscles of a lower limb of a user.

14. An apparatus according to claim 1, wherein the electrical stimulation means comprises a first electrical contact surface and a second electrical contact surface; wherein the first and second electrical contact surfaces are adapted to contact a first and a second limb, respectively of a user, in use.

15. An apparatus according to claim 14, wherein the first and second electrical contact surfaces are adapted to contact a first foot and a second foot, respectively of a user, in use.

16. An apparatus according to claim 1, wherein the processor only generates the first processor output signal when the electrical stimulation means applies the electrical stimulation voltage; or wherein the processor only generates the second processor output signal when the electrical stimulation means applies the electrical stimulation voltage.

17. An apparatus according to claim 1 further comprising a remote device, wherein the first output signal comprises a wireless data signal and the remote device is adapted to receive the wireless data signal from the apparatus and to generate a remote user output signal in response to the received wireless data signal.

18. An apparatus according to claim 17, wherein the remote device is a mobile device and the remote user output signal generated by the mobile device comprises is generated on a user interface of the mobile device by application software on the mobile device.

19. An apparatus according to claim 17, wherein the remote device comprises a user input device which is adapted to receive an input from a user; in response to a received input, the remote device being adapted to transmit a remote user input signal to the apparatus, the processor being adapted to receive the remote user input signal and to control the electrical stimulation voltage in response to the received remote user input signal, in use.

* * * * *